United States Patent

[11] 3,576,977

| [72] | Inventor | Robert H. Kolb |
| | | Cypress, Tex. |
| [21] | Appl. No. | 755,304 |
| [22] | Filed | Aug. 26, 1968 |
| [45] | Patented | May 4, 1971 |
| [73] | Assignee | Shell Oil Company |
| | | New York, N.Y. |

[54] SYSTEM AND METHOD FOR CONTROLLING THE POSITIONING SYSTEM OF A PIPELAYING VESSEL
4 Claims, 4 Drawing Figs.

[52] U.S. Cl. ............................................. 235/150.27,
   61/72.1, 114/144, 114/235
[51] Int. Cl. ....................................................... G06g 7/70,
   B63b 35/04
[50] Field of Search ............................................ 235/150.27;
   114/144, 235; 61/72.1, 2.3

[56] References Cited
UNITED STATES PATENTS

| 3,187,704 | 6/1965 | Shatto, Jr. et al. | 114/144 |
| 3,280,311 | 10/1966 | Shatto, Jr. et al. | 235/150.27 |
| 3,331,212 | 7/1967 | Cox et al. | 61/72.3 |

Primary Examiner—Malcolm A. Morrison
Assistant Examiner—Felix D. Gruber
Attorneys—Theodore E. Bieber and J. H. McCarthy

ABSTRACT: A system and method for controlling the movement, position and orientation of a pipelaying vessel in a manner designed to permit moving the vessel along a desired route while maintaining a desired tension in the pipe and while minimizing the bending forces in the pipe and pipe support structure which result from crosscurrents or misalignment of the vessel. Vessel movement along the route may be at a selected steady rate or may be intermittent and synchronized with the pipeline assembly process being conducted onboard.

SYSTEM AND METHOD FOR CONTROLLING THE POSITIONING SYSTEM OF A PIPELAYING VESSEL

CROSS-REFERENCE TO RELATED APPLICATION

The present application is related to a copending application Ser. No. 771,964, filed Oct. 30, 1968 and entitled "A Heading Control System for a Pipelaying Vessel."

BACKGROUND OF THE INVENTION

The above-referenced copending application describes a method and apparatus for laying a pipeline in a water-covered area wherein the heading of the pipelaying vessel is controlled to minimize the stress on the pipe and on the pipe support structure or stinger as it is commonly called. The system described is particularly useful in laying pipe in a water-covered area having a considerable crosscurrent. The crosscurrent tends to move the pipe laterally with respect to the route along which the pipe is laid. This lateral movement of the pipe creates bending and shear stresses in both the pipe and the pipe-supporting structure extending from the vessel.

The copending application describes a method for laying pipe that minimizes the stress on the pipe and the stinger resulting from the crosscurrents. More particularly, the copending application describes a method in which the pipelaying vessel is disposed at an angle to the route along which the pipe is to be laid. Thus, the pipe leaves the vessel in a gentle curved configuration that greatly reduces the stresses created in the pipe and in the stinger as a result of the currents.

While the heading of the vessel is disposed at an angle to the route along which the pipe is to be laid, the vessel actually travels along the route so that the pipe is laid along the desired route. The movement and heading of the vessel is controlled either manually or by an automatic vessel position control system. While the copending application indicates that the vessel movement may be controlled by a positioning system, no positioning system is described or shown.

SUMMARY OF THE INVENTION

The present invention relates to a position control system for controlling the movement of the pipelaying vessel described in the copending application. The invention is particularly related to dynamically positioning a pipelaying vessel having propulsion means consisting of at least two or more propulsion units both of which are variable in both thrust magnitude and direction. Of course, the invention can also be adapted with modifications to control pipelaying vessels having other positioning means, as for example, a vessel that is positioned by a multiple anchor array and moved by taking in or paying out anchor lines; or by a vessel having bow and stern athwartship thrusters supplementing a conventional propulsion system.

The positioning system includes means for vectorially combining three signals indicating: (1) the desired movement of the vessel in a direction transverse to the pipelaying route, (2) the desired change in heading of the vessel and (3) the desired movement of the vessel along the route. The combined signals are used to control the operation of the various thrusters or anchor lines comprising the positioning system on the pipelaying vessel.

BRIEF DESCRIPTION OF THE DRAWINGS

The present invention will be more easily understood from the following detailed description of a preferred embodiment when taken in conjunction with the attached drawings in which.

DESCRIPTION OF A PREFERRED EMBODIMENT
HEADING CONTROL

Figure 1:
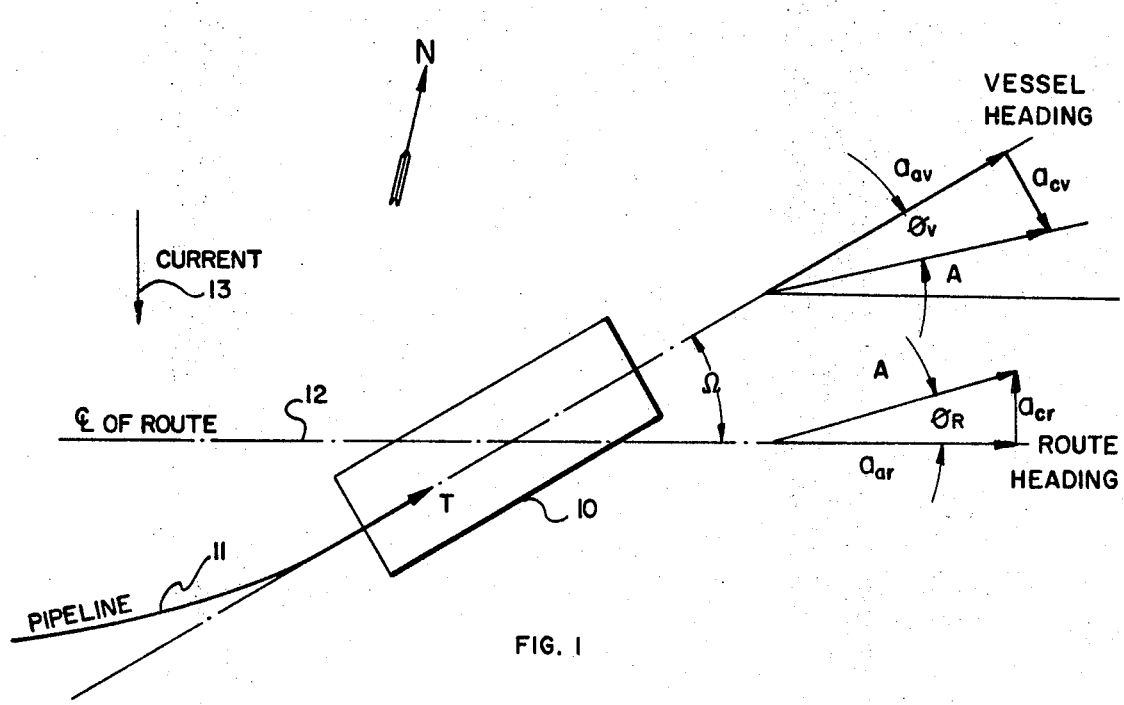
FIG. 1 is a schematic plan view of a pipelaying vessel showing the various vectors and angles involved in the present invention.

Referring now to FIG. 1 there is shown a pipelaying vessel 10 that is laying a pipeline along a route 12. The assembled pipeline 11 is discharged from the end of the vessel as shown or from the end of a stinger (not shown) at an angle $\Omega$ to the desired route. This is the angle which is controlled to maintain the desired stress conditions in the pipeline and in the stinger as set forth in the copending application.

A tension force T is maintained at the inboard end of the pipeline to control the bending stresses in the span of pipe suspended from the vessel to the bottom of the body of water. This force is applied by a pipe-tensioning system that is capable of measuring the force applied to the pipe and providing a signal proportional thereto to the vessel positioning system described below. The tension can be measured by various means, for example, by mounting the pipe-tensioning system on the vessel so that it is free to move with respect to the vessel and then restraining the system by a means that includes a load cell or similar force measuring means. When operating in adequate water depths and with a reasonably flexible pipe, the tension system is operated so as to either hold the pipe fixed relative to the vessel during assembly and fabrication periods or to pay out pipe at a controlled rate during move up periods. On certain occasions the system may also be used to pull in pipe at a controlled rate. While the pipe is being held fixed relative to the vessel, the tension T can be controlled by moving the vessel backwards or forward along the route. To maintain a near tension when additional pipe is being payed out or pulled in, the vessel must move forward or backwards at a rate equivalent to the payout or pull-in rate and be stopped after moving a distance equal to the amount of pipe payed out or pulled in. Should a pipeline fabrication system be used which permits paying out pipeline at a slow but constant rate, the move up rate of the vessel along the route must be controlled to equal the payout rate if the tension applied to the pipeline is to be maintained at its desired value. Near constant tension can be maintained in all these situations by measuring the instantaneous tension force directly and comparing it to the desired value and generating a signal proportional to the difference therebetween. This difference or error signal can then be used either manually or automatically to control the thrust or force applied to the vessel by its positioning system along the direction of the route. A system for measuring tension and controlling a vessels movement to maintain the tension within desired limits is described in U.S. Pat. No. 3,331,212.

When laying large stiff pipe in relatively shallow water the suspended span of pipe is incapable of absorbing the wave induced surge motions of the barge without undue tension variation and it is not practical for the tension system to either hold the pipe fixed relative to the barge or pay it out or pull it in at a fixed rate. Under these conditions the tension system must apply a near constant force to the pipe while permitting either its position to oscillate about a fixed position or its velocity to oscillate about a steady payout or pull-in rate. When so operating, the average position or the average velocity of a point on the pipe relative to a point on the vessel must be monitored manually or automatically, compared with the desired position or velocity and the difference or error signal thus determined used to control the thrust or force applied to the vessel along the direction of the route by the vessel's positioning system.

The timing and rate of vessel moveup can be controlled and synchronized with the fabrication operation by the operator of the tensioning system. The system is set to hold a point or the average position of a point on the pipe fixed relative to the vessel during welding and other fabrication work, or is set to payout pipe at a suitable rate during moveup periods. The tension control system operates the positioning system to accelerate and decelerate the vessel during moveup and to adjust its position along the route at all times i.e. during fabrication to maintain the tension at or near its desired value. To initiate vessel moveup, the tensioning system operator has only to start paying out pipe which causes a reduction in tension resulting in the control system causing the thrusters or positioning system to move the vessel ahead along the route to restore the tension to its set value. To stop vessel moveup the operator has only to stop paying out pipe.

Route Control

While maintaining the heading of the vessel at a proper angle to the route to control bending R the pipe and the support structure and while maintaining the proper tension in the pipe during both standstill and vessel moveup conditions, the vessel-positioning control system must also assure that moveup when it occurs takes place along the direction of the route and that the vessel's transverse position relative to the route centerline is maintained adequately close thereto so that the pipeline will be laid substantially along the desired route. This can be accomplished in accord with this invention by supplying a signal to the position control system related to the known compass heading of the route $\Phi_R$ and a control signal proportional at all times to the transverse deviation of the vessel from the center of the route. This control signal can be provided by a helmsman steering by direct reference to a set of preplaced anchored floating buoys or similar navigation aids used to mark the route or it can be provided automatically by a sonic navigation system responding to preplaced bottom mounted sonic marker beacons or transponders or by a radio positioning system. Systems for providing these measurements are described in Patents 3,187,704 and 3,280,311.

Figure 2:
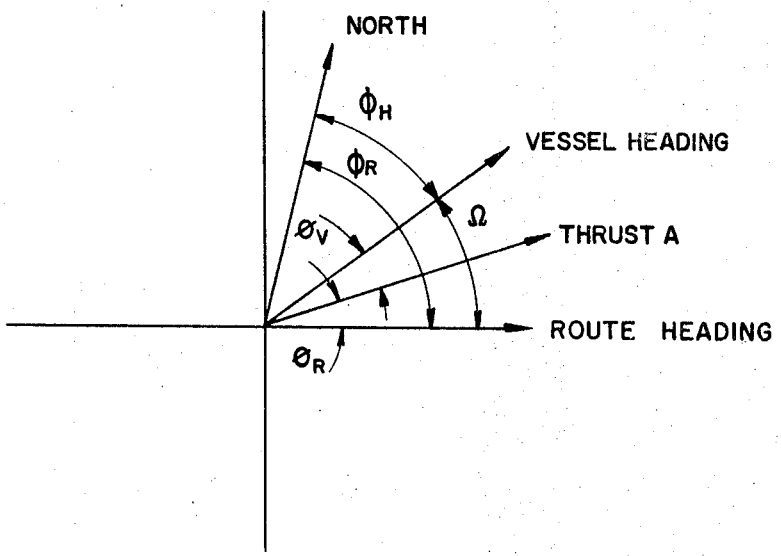
FIG. 2 is an azimuth diagram showing the various angles involved in the present control system related to either magnetic or geographical north.

Referring to FIG. 1, the signal from the tension control system proportional to the deviation of the tension from the set value is represented by the vector $a_{ar}$ directed along the route direction and the signal from the route control system proportional to the deviation of the vessel position is represented by the cross route vector $a_{cr}$. Not shown, but equally necessary, is a signal H from the heading control system proportional to the deviation of the heading from that required to give the desired bending condition in the pipe and stinger structure. The signal H can be obtained in various ways, for example, the stinger structure can be mounted so that it can flex relative to the laying vessel. Thus, the stinger structure will align itself with the pipe to reduce bending in the pipe to a minimum. If the pipe bends, it will tend to move the stinger structure and this movement can be detected. For example, a motion or displacement sensing means can be used to detect movement of the stinger structure. When a fixed stinger structure is used the movement or stress between the pipe and the stinger can be measured. This can be done by the use of strain gauges that measure the lateral force between the pipe and the stinger. The measured force in both examples will be referred to as the pipe bending force. As shown in vectors $a_{ar}$ and $a_{cr}$ are equivalent to the vector A having an angle $\theta_R$ with the route heading. This vector A can also be resolved into components $a_{av}$ and $a_{cv}$ directed respectively along and crosswise to the longitudinal axis or heading of the vessel. $\theta_V$ is the angle of the vector A relative to the vessel heading. FIG. 2 shows that the angle $\Omega$ between the vessel heading and the route heading can be determined if the compass headings $\Phi_H$ and $\Phi_R$ of the vessel and the route are supplied, and that given $\Omega$ and $\theta_R$, $\theta_V$ can be determined. $\theta_R$ is determined from $a_{ar}$ and $a_{cr}$ as shown in FIG. 1.

Figure 3:
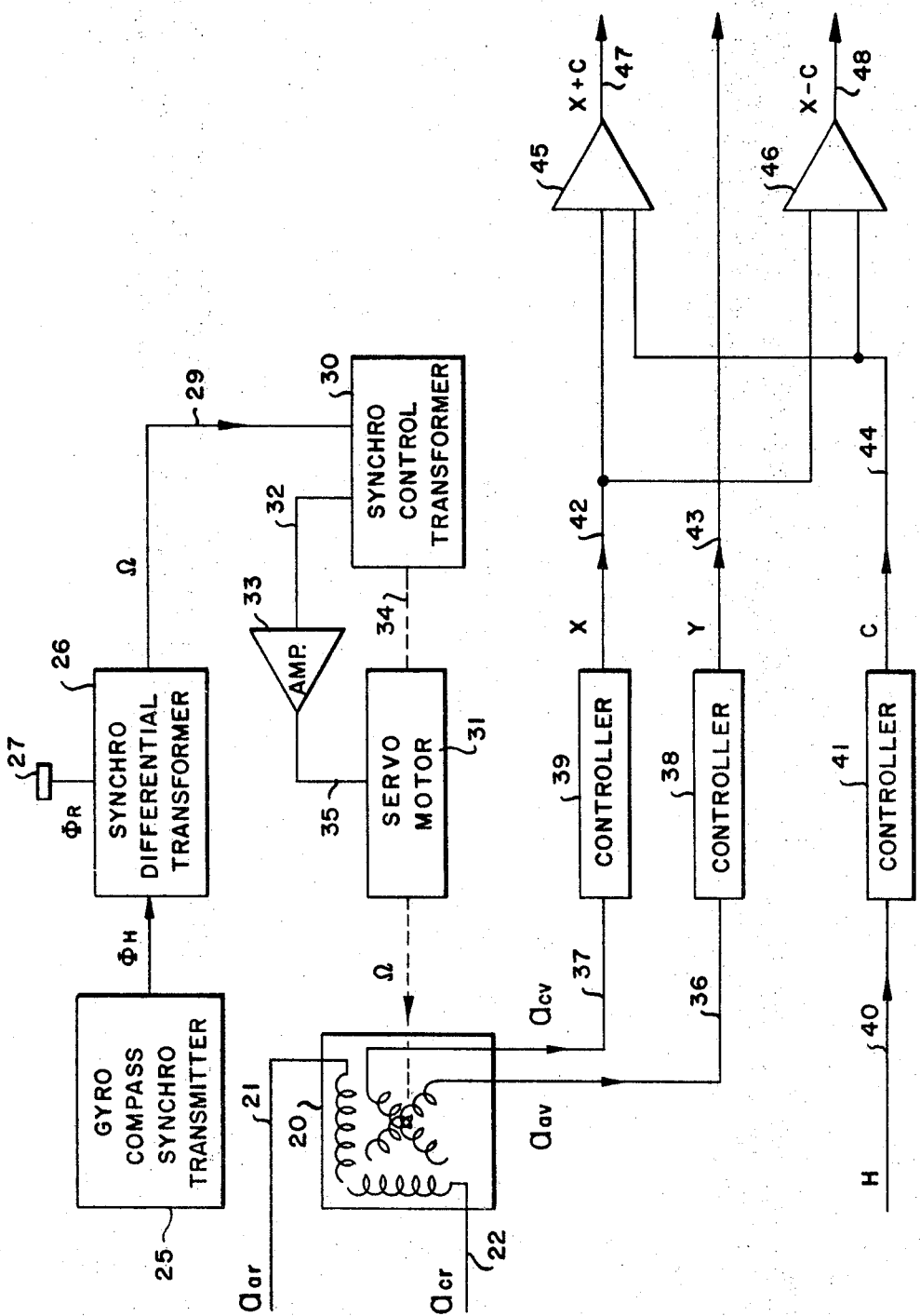
FIG. 3 is a block diagram of a control system constructed according to this invention suitable for use with fixed thrusters.

Referring now to FIG. 3, there is shown in block diagram form a positioning control system suitable for utilizing the heading control, tension control and route control system signals in computing the thrust magnitude and direction for each of the propulsion or anchoring units on the pipelaying vessel. The system shown is particularly adapted for use on a pipelaying vessel having a conventional main propulsion system and bow and stern mounted athwartship thrusters. The system, as will be shown, can also be adapted for use with a vessel having one or more steerable thruster-type propulsion units located at its bow and a similar unit or units at its stern.

The signal from the tension control system $a_{ar}$ and the signal from the route control system $a_{cr}$ are supplied as electric signals over leads 21 and 22 to a synchro resolver 20. There they are combined internally to produce an alternating magnetic field whose magnitude is proportional to the vector A and whose angular orientation is related to $\theta_R$. A synchro transmitter 25 is positioned according to the vessel's magnetic or gyro compass heading generates synchro electrical signals having the electrical angle $\Phi_H$. These in turn are fed to a synchro differential transformer 26 whose shaft is manually positioned by the helmsman through the control knob 27 to the route compass heading $\Phi_R$. The output synchro signal on lead 29 has an electrical angle equal to the angle $\Omega$. This signal is fed to the synchro control transformer 30 ganged on a common shaft with the servomotor 31 and the synchro resolver 20. The synchro control transformer generates a signal on lead 32 whose amplitude is proportional to the difference between the electrical angle $\Omega$ on lead 29 and the mechanical angle of the gang shaft 34. This signal is amplified by the amplifier 33 and fed over lead 35 to the servomotor 31 which revolves shaft 34 until its mechanical angle equals $\Omega$. The difference in angle between the shaft 34 of the resolver 20 and the internal magnetic field whose strength is equal to A and whose angle is $\theta_R$ is therefore $\theta_V$. Thus, the magnetic field induces signals proportional to $a_{av}$ and $a_{cv}$ in the resolver's rotor windings. These signals are applied to lead 36 and lead 37 and fed to the inputs of the three-mode controllers 38 and 39, respectively. The signal H from the heading control is applied as an electrical signal over the lead 40 to a third three-mode controller 41.

The three controllers 38, 39, and 41 are essentially conventional process controllers having adjustable rate and reset or integral action as well as adjustable proportional control. An important aspect of this invention is the provision of these controllers and their location in the system where each handles a signal controlling a movement of the vessel in one of its basic independent modes; namely, lateral translation, longitudinal translation, and rotation about its yaw axis. The adjustable proportional band and rate and reset time constants of these controllers allow matching the characteristics of the closed-loop control systems to the dynamics of the vessel and its positioning system in each of these modes thus preventing oscillation, minimizing offset errors and improving response time.

The output signal from controller 39 is labeled X and applied to lead 42, that from controller 38 is labeled Y and applied to lead 43, and that from controller 41 is labeled C and applied to lead 44. Forty-five and 46 are summing devices such as operational amplifiers which permit algebraically adding two signals together. In 45 the signals X and C are combined to give the signal (X+C) on lead 47, and in 46 the same two signals are oppositely combined to give the signal (X−C) on lead 48.

If the pipelaying vessel were positioned by a conventional propulsion system thrusting fore or aft and a reversible athwartship thruster at the bow and another reversible athwartship thruster at the stern and if the signal (X+C) were applied to the throttle or thrust controller of the bow thruster while the signal (X−C) was applied to thrust controller of the stern thruster and the signal Y was applied to the thrust controller of the main propulsion system, the following would result. Longitudinal thrust proportional to Y would be developed by the main propulsion unit and lateral thrust proportional to X would be developed by the athwartship thrusters. The combined effect of these two thrust vectors would be a thrust vector proportional to A in the direction $\theta_V$ with respect to the vessel and $\theta_R$ with respect to the route, this being the vector called for by the signals $a_{ar}$ and $a_{cr}$ from the tension control system and the route control system. Meanwhile and independently the signal H from the heading control system has resulted in the signal C being applied equally but in opposite direction to the bow and stern athwartship thrusters so that a turning couple related in both direction and magnitude to H is applied to the vessel. Thus, the thrusters act to move the vessel in a manner which will reduce the errors in heading, tension and cross-route position which occasioned the signals H, $a_{ar}$ and $a_{cr}$, respectively, in the beginning.

In practice the signals X, Y, and C in addition to being proportional to the signals $a_{cr}$, $a_{ar}$, and H also contain components proportional to the rate of change or derivative, and the duration or integral of the input signals as well. These components are due to the rate and reset features of the three-mode controllers. As explained earlier these signal components adapt the control system to the dynamic characteristics of the vessel and its positioning system so as to improve response time, minimize offset errors, and eliminate oscillations.

Figure 4:
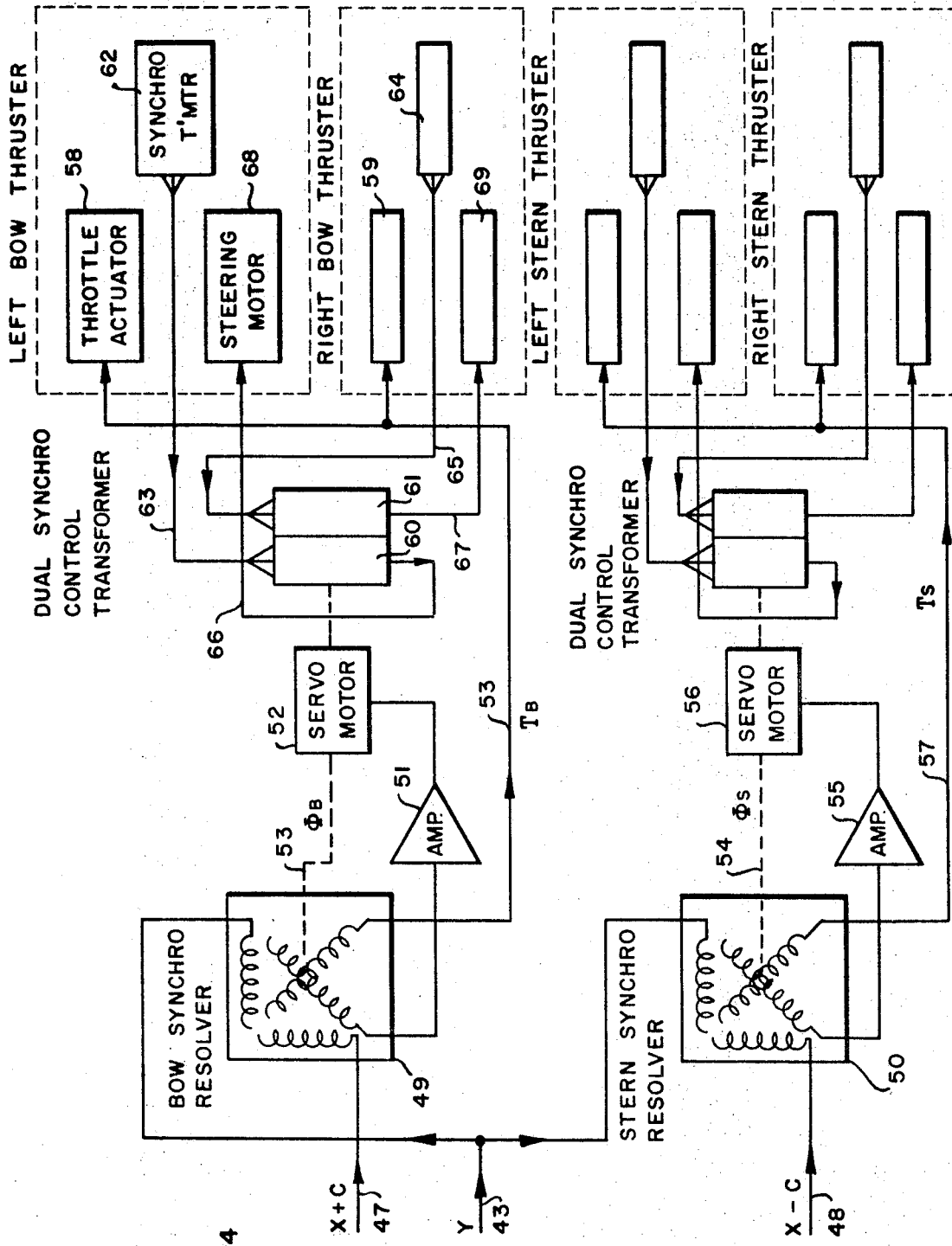
FIG. 4 is a block diagram of an extension of the system of FIG. 3 adapting it for use with steerable thrusters.

If, instead of fixed reversible thrusters operating at right angles to each other as in the case above, the vessel is equipped with one or more steerable thrusters located at the bow and one or more at the stern, the mutually perpendicular thrust commands FIG. 3 must be converted to polar thrust commands specifying the magnitude and angle of thrust for each thruster. A block diagram of one arrangement for doing this is shown in FIG. 4. The system shown in FIG. 4 is suitable for use with a positioning system comprised of four steerable thrusters with one mounted at each of the four corners of the vessel. In this particular arrangement the two bow thrusters are given the same thrust and direction commands and the two stern thrusters are similarly grouped.

As shown in FIG. 4, the signals (X+C) and Y are fed to a bow synchro resolver 49 and the signals (X−C) and Y are fed to a stern synchro resolver 50. Within the resolvers the input signals are combined into an alternating magnetic field whose amplitude is proportional to their vector sum and whose angular orientation is the angle of the vector sum. The resolver rotor carries two windings arranged at right angles to each other so that when one winding is aligned with the internal magnetic field of the resolver the other is perpendicular to it. Under these conditions the signal induced in the aligned winding is proportional to the amplitude of the vector sum and the signal induced in the other winding is zero. The shaft angle of the rotor then equals the vector angle. Such an alignment can be automatically accomplished and maintained by using the signal from the nonaligned rotor winding to control the rotor shaft position through a servoamplifier and servomotor which act always to null the signal in the nonaligned winding.

When the signals (X+C) and Y are fed to the stator windings of the bow resolver 49 the servoamplifier 51 and the servomotor 52 rotate the resolver shaft 53 to the angle $\theta_B$ which is the angle of their vector sum and the angle at which the bow thrusters should thrust. At this angle the signal $T_B$ is induced in the aligned rotor winding and is applied to lead 53. The amplitude of $T_B$ is proportional to the amplitude of the vector sum of (X+C) and Y and to the amount of thrust required of each of the bow thrusters at the angle $\theta_B$.

In the same manner, (X−C) and Y are fed to the stator of the stern resolver 50 whose rotor shaft 54 is positioned to the angle $\theta_S$ by the servoamplifier 55 and the servomotor 56. The signal $T_S$ is induced in the aligned rotor winding and applied to the lead 57.

The signal $T_B$ on lead 53 is applied to the throttle actuator 58 of the left bow thruster and the throttle actuator 59 of the right bow thruster causing these thrusters to provide a thrust proportional to $T_B$. At the same time the two synchro control transformers 60 and 61 ganged on the shaft 53 with the bow synchro resolver 49 and the servomotor 52 have their rotors positioned to the angle $\theta_B$. Each of the bow thrusters is equipped with a synchro transmitter 62 and 64 whose rotor is synchronized with the thruster steering shaft so that they transmit as an electrical angle the thrust angle of their particular thruster. The synchro angle signal from transmitter 62 is transmitted over lead 63 to control transformer 60 which generates and applies to lead 66 an output signal proportional to the difference between the thruster synchro transmitter angle and the shaft angle $\theta_B$. This signal is applied to the thruster steering motor 68 which acts to turn the thruster until the thruster angle is equal to the angle $\theta_B$ and to maintain it there thereafter correcting automatically each deviation as it occurs as $\theta_B$ changes in response to changes in $a_{ar}$, $a_{cr}$ and C. In a similar manner control transformer 61, transmitter 64 and steering motor 69 keep the right bow thruster always thrusting in the direction $\theta_B$. Also in a similar manner the thrust output and direction of the two stern thrusters are controlled by the signal $T_S$ and the shaft angle $\theta_S$ which represent the vector sum in the stern synchro resolver 50 of the input signals thereto, namely (X−C) and Y.

Other selections and arrangements of thrust or propulsion units or even of anchoring units can be accommodated by similar arrangements of vector transforming elements and control components.

For those occasions when the vessel may not be engaged in pipelaying, the position control system described above can readily be adapted to a station keeping system for maintaining the vessel at a given fixed location with a given heading. To accomplish this a signal proportional to the difference between the desired and actual vessel heading can be applied to controller 41 shown in FIG. 3 on lead 40 in place of signal H and signals $a_{ar}$ and $a_{cr}$ can be replaced on leads 36 and 37 by signals proportional to the deviation of the vessel from its desired position in the longitudinal and lateral directions respectively. These latter signals may be derived from a taut wire line inclinometer system or from an acoustic or radio positioning system.

I claim:

1. A method for controlling the movement and heading of a pipelaying vessel, said vessel having a plurality of propulsion means disposed on the vessel to effect movement thereof, so as to lay a pipeline along a predetermined route on the bottom of a body of water while simultaneously maintaining a selected tension applied to the inboard end of the pipeline and maintaining a vessel heading which will assure a selected safe stress distribution in the pipe support structure or stinger at the rear of the vessel and in the pipe in the vicinity of said structure, said method comprising:

measuring the pipe-bending force and generating a heading error signal proportional to the difference between the measured force and the desired pipe-bending force;

measuring the tension existing in the pipeline at its inboard end where it is being held fixed relative to the vessel or being payed out or pulled in at a given rate and generating a tension error signal proportional to the difference between the measured tension and the desired tension;

measuring the deviation of the vessel from the desired route line in a direction transverse to the route line and generating a route error signal proportional to that deviation;

applying the heading error signal to the vessel-positioning means in such a manner as to cause the positioning means to generate a turning force acting to establish a vessel heading which will restore the measured bending force in the pipe to its desired value and hence the heading error signal to zero;

applying the tension error signal to the vessel positioning means in such a manner as to cause the positioning means to generate a force acting to move the vessel along the route heading irrespective of the vessel's actual heading in a direction which will restore the tension in the pipeline at its inboard end to the desired value and hence the tension error signal to zero;

applying the route error signal to the vessel-positioning means in such a manner as to cause the positioning means to generate a turning couple acting to move the vessel transversely to the route direction irrespective of the vessel's actual heading in a direction which will restore the vessel to its desired position relative to the route centerline and hence the route error signal to zero; and controlling the timing and the rate at which pipe is payed out or reeled in to control the vessel moveup along the route by controlling the timing and rate at which pipe is allowed to be payed out or reeled in.

2. The method of claim 1 wherein the tension error signal calling for positioning force along the route direction and the route error signal calling for positioning force transverse to the route direction are resolved into equivalent error signals calling for force along the fore and aft axis of the vessel and for force along the athwartship axis of the vessel, applying these error signals through three-mode controllers to the positioning means to cause the positioning means to generate forces along the respective axis of the vessel and applying the heading error signal to the positioning means through a similar controller, so that the gain and time constants of the control system can be adjusted to match the dynamic characteristics of the vessel and its positioning means in the vessels three natural modes, fore and aft translation, lateral translation and rotation about the vertical or yaw axis.

3. The method of claim 2 and in addition applying the signal calling for force in a fore and aft direction to first positioning means fixed in attitude so as to apply reversible force only along the longitudinal axis of the vessel, and applying the signal calling for force in an athwartship direction to second positioning means fixed in attitude so as to apply a reversible force only along the direction of the athwartship or pitch axis of the vessel, and applying the signal calling for a rotational force about the yaw axis in equal and opposite amounts to a third positioning means fixed in parallel attitudes and separated by a significant horizontal distance so as to apply a reversible turning force about the yaw axis, one of said third positioning means being located at the bow of the vessel and one of said third positioning means being located at the stern.

4. The method of claim 2 wherein the signal calling for force in a fore and aft direction is vectorially combined with the signal calling for force in a lateral direction into a single force signal having a vectorially equivalent amplitude and direction angle suitable for controlling respectively the thrust and direction of a steerable thrust unit and applying said single force signal to at least two such steerable thruster units separated by a significant horizontal distance so that the signal calling for a turning force can be differentially added in vectorially with the longitudinal and lateral force signals to modify the thrust output and direction of the two units in such a way as to provide the required turning force, said arrangement being adaptable to any desired number of steerable thrusters arranged in the most efficient or most convenient pattern.